United States Patent [19]

Chestnutt

[11] Patent Number: 4,590,702
[45] Date of Patent: May 27, 1986

[54] FISHHOOK REMOVING TOOL

[76] Inventor: John E. Chestnutt, 107 N. Laburnum Ave., Richmond, Va. 23223

[21] Appl. No.: 682,992

[22] Filed: Dec. 18, 1984

[51] Int. Cl.$^4$ ............................................. A01K 97/00
[52] U.S. Cl. ...................................................... 43/53.5
[58] Field of Search ..................... 43/53.5; 128/12, 17, 128/20

[56] References Cited

U.S. PATENT DOCUMENTS

| 1,539,221 | 5/1925 | Tennant | 43/53.5 X |
| 2,507,083 | 5/1950 | Anderson | 43/53.5 |
| 2,688,816 | 9/1954 | Bondesen | 43/53.5 |
| 2,722,080 | 11/1955 | Lemberger | 43/53.5 |
| 2,797,523 | 7/1957 | Dillard | 43/53.5 |
| 3,869,822 | 3/1975 | Tieman | 43/53.5 |

*Primary Examiner*—Nicholas P. Godici
*Assistant Examiner*—M. Jordan
*Attorney, Agent, or Firm*—Harvey B. Jacobson

[57] ABSTRACT

A first elongated tubular member is provided having first and second end portions, an elongated pull member is telescoped into and longitudinally shiftable within the first end portion with a first end of the pull member projecting endwise outwardly of the first end portion and a second end of the pull member longitudinally shiftable in the second end portion of the tubular member. The second tubular member end portion includes diametrically opposite longitudinal slots defined between longitudinally extending opposite side strip sections of the tubular member second end portion. A finger-engageable crosshead has the second end of the pull member centrally anchored thereto and the crosshead includes slots through which the strip sections of the second end portion of the tubular member are slidingly received. Abutment structure is removably anchored between and from the ends of the strip sections of the tubular member remote from the tubular member first end portion and a coiled compression spring is disposed about the second end portion of the tubular member between the abutment and the crosshead. The first end of the pull member includes a transverse opening formed therethrough elongated longitudinally of the pull member and an entrance slot opens into the opening through one side thereof intermediate its opposite ends.

6 Claims, 6 Drawing Figures

FISHHOOK REMOVING TOOL

BACKGROUND OF THE INVENTION

Rod and line fishermen often catch fish with hooks or hooked lures which are substantially fully swallowed by the caught fish and in such instances it is difficult for the fisherman to remove his hook from within the throat or gullet of the caught fish. Accordingly, a need exists for structure which may be used to facilitate removal of a fishhook or hook-equipped lure which has been substantially swallowed by a caught fish.

Although various forms of fishhook removing tools heretofore have been provided, few have been constructed in a manner to provide an efficient fishhook removing tool and yet simply constructed so that the fishhook removing tool may be marketed at a low cost.

Still further, various forms of known fishhook removing tools include movable parts which are guided relative to each other by inefficient guiding structure and which therefore render operation of the fishhook removing tool unreliable and difficult.

The fishhook removing tool of the instant invention has been specifically designed to provide a tool which may be used effectively to remove a fishhook and yet including structure which will be dependable in operation and enable manufacture at a low cost.

BRIEF DESCRIPTION OF THE INVENTION

The fishhook removing tool of the instant invention is in the form of a hand held wand with one end thereof being adapted to be held by a fisherman wishing to remove a fishhook and the other end thereof equipped with structure for releasably engaging a fishhook which has been substantially swallowed by a caught fish. In addition, the wand other end includes structure by which that end of the wand may be engaged with a fishing line and guided by the line downwardly along the latter toward the swallowed fishhook and over the snelled end thereof for engagement with the swallowed fishhook, even in a dimly lighted environment.

The main object of this invention is to provide a fishhook removing tool which may be used effectively by substantially any fisherman in order to remove a fishhook which has been substantially swallowed by a caught fish.

Another object of this invention is to provide a fishhook removing tool including structure by which the fishhook engaging end thereof may be engaged with and guided downwardly along a fishing line and over the snelled end of a swallowed fishhook for assistance in operatively engaging the fishhook removing tool with the fishhook to be removed.

Still another important object of this invention is to provide a fishhook removing tool which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
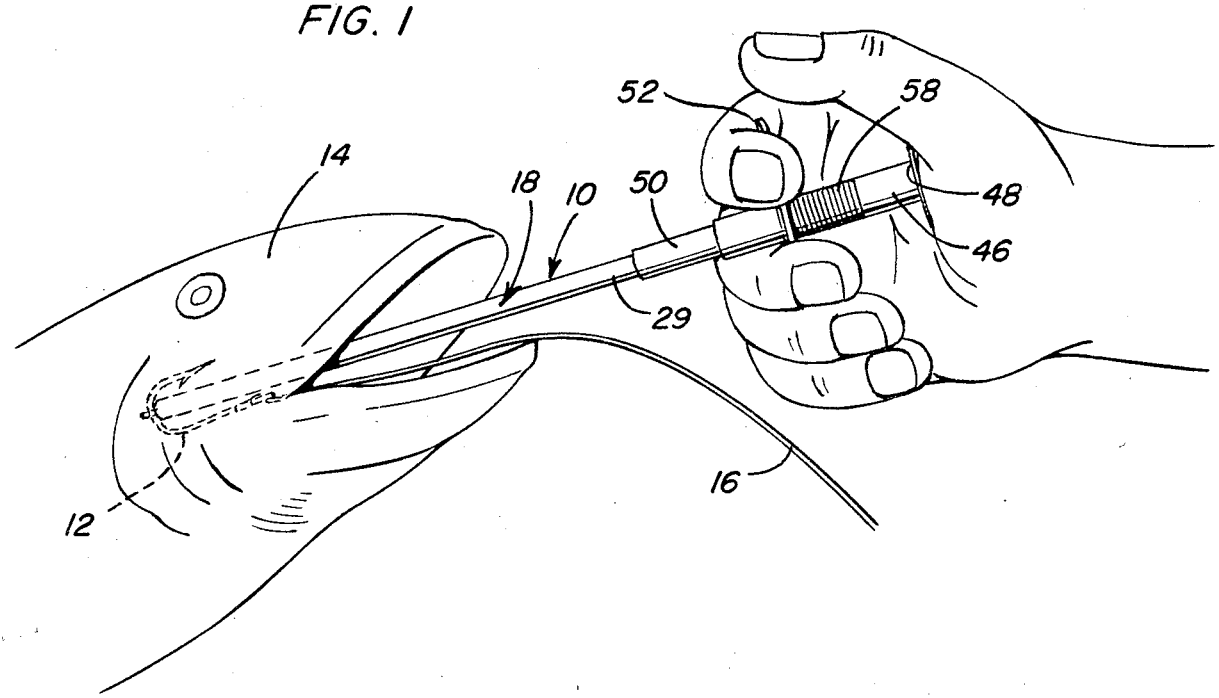
FIG. 1 is a perspective view of the fishhook removing tool being used to remove a fishhook which has been at least partially swallowed by a caught fish.
Figure 2:
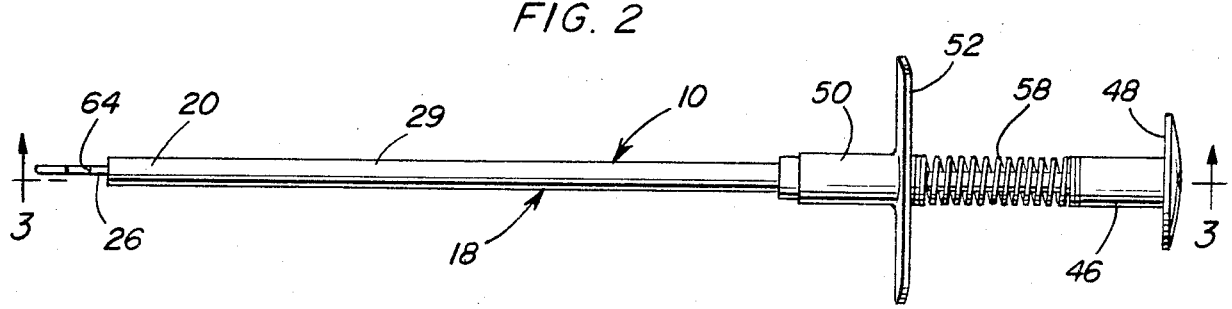
FIG. 2 is a side elevational view of the fishhook removing tool.

Referring now more specifically to the drawings the numeral 10 generally designates the fishhook removing tool of the instant invention. In FIG. 1 the tool 10 is illustrated in use during the removal of a fishhook 12 from the gullet of a caught fish 14 which has substantially fully swallowed the fishhook 12. The fishhook 12 is of course attached to a fishline 16.

The tool 10 includes a first tubular member or construction referred to in general by the reference numeral 18 and including first and second end portions 20 and 22. In addition, the tool 10 includes an elongated pull member 24 having first and second ends 26 and 28. The first tubular member or construction first end portion 20 comprises a constant diameter sleeve member 29 and the second end portion of the tubular construction or member 18 includes a pair of strip members or sections 30 and 32 including free ends 34 and base ends 36 and 38. The strip members 30 and 32 are transversely arcuate and define segments of a cylinder with the base ends 36 and 38 being integrally joined and having abutting corresponding longitudinal edges to define a sleeve portion. The base ends 36 and 38 and the sleeve portion defined thereby are telescoped over and secured to the adjacent end of the sleeve member. The free ends 34 include internal peripherally extending ribs 40 and a plug member 42 having a circumferential groove 44 is interlockingly secured between the free ends 34 with the ribs 40 being received in the groove 44, a sleeve 46 being telescoped over the narrow ends 34 in order to prevent movement of the latter away from each other and thereby maintain the plug member 42 secured between the narrow ends 34.

The outer end of the plug 42 has a dish-shaped abutment member 48 anchored relative thereto against which the adjacent end of the sleeve 46 is abutted and a second sleeve 50 is telescoped over the base ends 36 and 38 of the strip members 30 and 32. The end of the sleeve 50 facing toward the abutment member 48 has a crosshead 52 secured thereto and the crosshead 52 includes slots 54 through which the free ends 34 of the strip members 30 and 32 are slidingly received. Accordingly, portions of the crosshead 52 are slidably received in the slots 56 defined by the second end portion 22 between adjacent longitudinal edges of the strip members 30 and 32.

Figure 3:
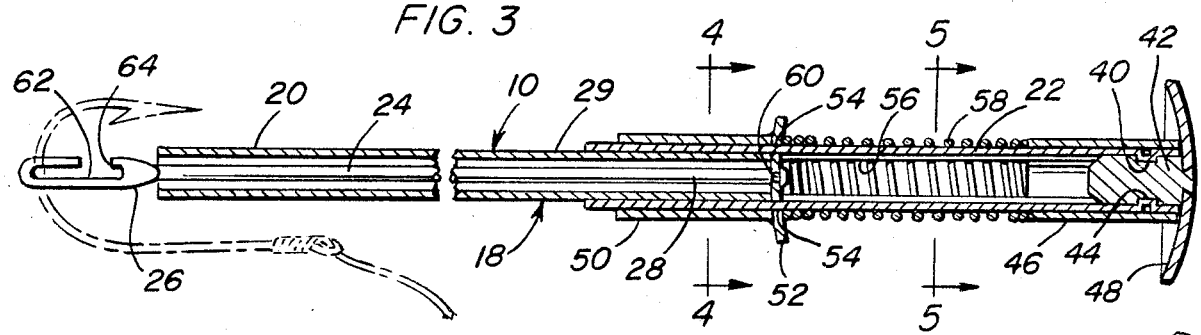
FIG. 3 is an enlarged fragmentary longitudinal sectional view taken substantially upon the plane indicated by the section line 3—3 of FIG. 2.
Figure 4:
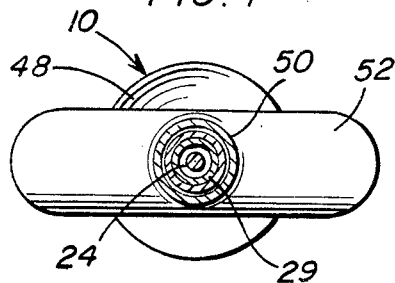
FIG. 4 is a transverse sectional view taken substantially upon the plane indicated by the section line 4—4 of FIG. 3.
Figure 5:
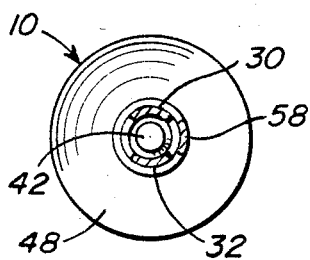
FIG. 5 is a transverse sectional view taken substantially upon the plane indicated by the section line 5—5 of FIG. 3.
Figure 6:
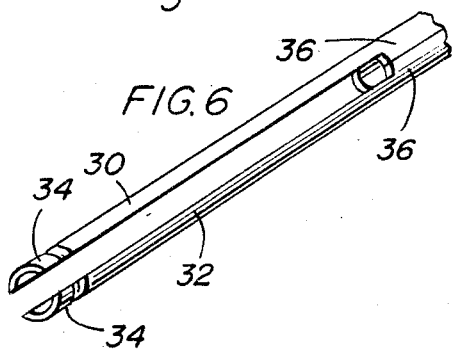
FIG. 6 is a perspective view of a diametrically opposite slotted end portion of one end of the major body portion of the tool.

A coiled compression spring 58 is disposed about the second end portion 22 between the crosshead 52 and the sleeve 46 and thereby yieldingly biases the pull member 24 and sleeve member 29 to the left and right, respectively, as viewed in FIG. 3 of the drawings to the limit positions thereof illustrated in FIG. 3. The second end of the pull member 24 is anchored through the central area of the crosshead 52 as at 60 and the first end of the pull member 24 projects endwise outwardly of the corresponding end of the sleeve member 29 and is provided with a transverse opening 62 formed therethrough. The opening 62 is elongated longitudinally of the pull member 24 and an entrance slot 64 opens into the opening 62 through one longitudinal marginal edge thereof intermediate the opposite ends of that longitudinal marginal edge.

In operation, the tool 10 is gripped in the manner illustrated in FIG. 1 of the drawings and the first end portion 20 of the pull member 24 is engaged with the fishing line 16. Then with the line 16 received through the opening 62, the tool 10 is advanced down the line 16, over the snelled end of the hook 12 and then engaged with the hooked portion of the hook 12 in the manner illustrated in FIG. 3. Thereafter, the crosshead 52 is pulled toward the abutment member 48 in order to retract the opening-equipped first end of the pull member 24 into the first end portion of the tubular member 18 in order to clampingly engage the hooked end of the hook 12 between the pull member 24 and the terminal end of the sleeve member 29. Thereafter, the tool 10 may be utilized to downwardly displace the hook 12 further in the gullet of the fish 14 in order to disengage the barbed end of the hook 12 from the gullet of the fish and the tool 10 may thereafter be used to extract the hook 12 from the gullet and mouth of the fish 14.

In order to disassemble the tool 10 it is merely necessary to grasp the sleeve 40 and to displace the latter toward the left as viewed in FIG. 3 of the drawings. When the sleeve 46 has been displaced to the left sufficiently to uncover the plug member 42, the latter may be slightly twisted in order to cam the free ends 34 of the strip members 30 and 32 apart for the purpose of removing the plug member 42 from between the free ends 34. Thereafter, the sleeve 46 and spring 58 may be telescoped from the right hand ends of the strip members 30 and 32 as illustrated in FIG. 3 of the drawings. Thereafter, the crosshead 52, sleeve 50 and pull member 24 may be shifted to the right relative to the tubular construction 18 in order to withdraw the strip members 32 from the slots 54. Of course, the tool 10 may be reassembled in the reverse sequence.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishhook removing tool including a first elongated tubular construction having first and second end portions, an elongated pull member telescoped into and longitudinally shiftable within said first end portion, said pull member including a first end projecting endwise outwardly of said first end portion and a second end longitudinally shiftable in said second end portion, said second end portion including longitudinal slot means formed therein, a finger-engageable member carried by said second end and projecting outwardly through and slidable in said slot means, said first end including a transverse opening formed therethrough and an entrance slot opening into said opening and outwardly of one side of said first end, spring means operatively connected between said pull member and tubular construction yieldingly biasing said pull member toward a position with said first end projecting outwardly of said first end portion, abutment surface means on said second end portion on the side of said finger-engageable member remote from said first end portion, said tubular construction being shiftable relative to said pull member, against the biasing action of said spring means, to a second postion with said transverse opening at least substantially fully recessed within said first end portion of said tubular construction, said tubular construction including a first sleeve member defining said first end portion and a U-shaped panel member, defining said second end portion, rolled into a configuration defining a pair of parallel strip members joined together at one pair of corresponding ends by a sleeve portion and being transversely arcuate, said sleeve portion being telescoped over the end of said first sleeve member remote from said first end of said pull member, said strip members defining said slot means therebetween, the other ends of said strip members including internal inwardly projecting ribs, a plug member including a circumferential groove embracingly received between said other ends of said strip members with said ribs seated in said grooves, said abutment surface means being carried by the other end of said plug member and projecting outwardly beyond said other end of said strip members, a sleeve telescoped over said other ends of said strip members and abutted against said abutment surface means, said spring means comprising a coiled spring telescoped over the ends of said strip members adjacent said sleeve portion and disposed beteen said sleeve and said sleeve portion.

2. The tool of claim 1 wherein said opening comprises a longitudinal slot formed in said first end transversely therethrough.

3. The tool of claim 2 wherein said entrance slot opens into said longitudinal slot through one longitudinal side margin thereof intermediate the opposite ends of said longitudinal slot.

4. The tool of claim 1 wherein said finger-engageable member comprises a crosshead carried by said second end and including slots formed therein through which said one pair of ends of said strip members are slidably received.

5. The tool of claim 4 wherein said opening comprises a longitudinal slot formed in said first end transversely therethrough.

6. The tool of claim 5 wherein said entrance slot opens into said longitudinal slot through one longitudinal side margin thereof intermediate the opposite ends of said longitudinal slot.

* * * * *